US011930301B2

(12) United States Patent
Liao et al.

(10) Patent No.: US 11,930,301 B2
(45) Date of Patent: Mar. 12, 2024

(54) SECURITY CAMERA WITH INTEGRATED FIELD NEAR COMMUNICATION CONTROLLED ENCRYPTION METHOD

(71) Applicant: LEDVANCE LLC, Wilmington, MA (US)

(72) Inventors: Wuqiang Liao, Shenzhen (CN); Ming Li, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 254 days.

(21) Appl. No.: 17/481,777

(22) Filed: Sep. 22, 2021

(65) Prior Publication Data

US 2023/0085767 A1    Mar. 23, 2023

(51) Int. Cl.
*H04N 7/18*       (2006.01)
*H04L 9/08*       (2006.01)
*H04W 4/02*       (2018.01)
*H04W 4/029*      (2018.01)

(52) U.S. Cl.
CPC ........... *H04N 7/183* (2013.01); *H04L 9/0819* (2013.01); *H04W 4/023* (2013.01); *H04W 4/029* (2018.02); *H04L 2209/80* (2013.01)

(58) Field of Classification Search
CPC ... H04L 9/0822; H04L 63/062; H04L 9/0819; H04L 2209/80; H04N 7/183; H04W 4/029; H04W 12/00; H04W 4/023
See application file for complete search history.

(56) References Cited

U.S. PATENT DOCUMENTS

| | | | |
|---|---|---|---|
| 2020/0112610 A1* | 4/2020 | Arnberg | H04W 4/70 |
| 2020/0201785 A1* | 6/2020 | Hanna | G11C 16/10 |
| 2023/0208622 A1* | 6/2023 | Griffin | H04L 9/0894 |
| | | | 380/279 |

* cited by examiner

*Primary Examiner* — Frantz B Jean
(74) *Attorney, Agent, or Firm* — Harry Hild

(57) ABSTRACT

A camera is provided that stores an encryption key locally and transmits the encryption key using near field communication (NFC) when the encryption key is requested by the user. In one embodiment, the camera includes a lens for recording video and an encryption engine for encrypting the video. The camera further includes a security chip for storing an encryption key locally in the camera. Additionally, the camera includes a near field communication (NFC) module that provides a bridge between the security chip of the camera and the device at which the user is viewing the images recorded by the lens. The NFC module includes memory for temporarily storing the encryption key and an NFC transceiver for sending the encryption key from the memory of the NFC module to the device at which the user is viewing the images recorded by the lens of the camera.

19 Claims, 5 Drawing Sheets

SECURITY CAMERA WITH INTEGRATED FIELD NEAR COMMUNICATION CONTROLLED ENCRYPTION METHOD

TECHNICAL FIELD

The present disclosure generally relates to methods and structures related to cameras, such as internet based digital cameras.

BACKGROUND

Digital camera systems are well known, including digital video cameras that can communicate using either a serial protocol or an internet protocol (IP protocol). These cameras are used for a wide variety of purposes, including for video communications when attached to a data processing system, or for remote monitoring of other locations when accessible over a network such as the Internet.

Some digital video camera systems are being used for security and monitoring purposes, such as for monitoring traffic conditions or office premises. Security camera videos are either stored locally (on the camera and/or SD card) or on the cloud. Cloud storage is a service that stores your cameras' videos on a remote server where you can access them using the internet. While IP-based digital video cameras are particularly convenient for remote access, present cameras and their associated data, there are security concerns. Security camera videos are either stored locally (on the camera and/or SD card) or on the cloud. Cloud storage is a service that stores your cameras' videos on a remote server where you can access them using the internet.

SUMMARY

The present disclosure provides methods and structures for providing internet enabled cameras having secure encryption. In one embodiment, the present disclosure provides a method of transmitting an encryption key from a camera to a mobile device of the user of the camera. The method may include integrating an encryption key into a security chip that is housed within the camera, and integrating a near filed communication (NFC) module into the camera. The near filed communication (NFC) module includes a near filed communication (NFC) transceiver and memory. In a following step, a request for an encryption key is received at the camera through an internet based communication from a user of the camera. In response to the request for the encryption key, a copy of the encryption key is transmitted from the security chip to the memory in the near filed communication (NFC) module of the camera. The encryption key is transmitted by near field communication (NFC) transmission when the mobile device of the user is brought into near field communication (NFC) range of the camera. When the encryption key is received by the mobile device, the copy of the encryption key that is stored on the memory is deleted.

In another aspect of the present disclosure, a camera is provided that stores an encryption key locally, and transmits the encryption key using near field communication (NFC) when the encryption key is requested by the user. In one embodiment, the camera includes a lens for recording video and an encryption engine for encrypting the video. The camera further includes a security chip for storing an encryption key locally in the camera. Additionally, the camera includes a near field communication (NFC) module that provides a bridge between the security chip of the camera and the device at which the user is viewing the images recorded by the lens. The near filed communication (NFC) module includes memory for temporarily storing the encryption key and a near filed communication (NFC) transceiver for sending the encryption key from the memory of the near filed communication (NFC) module to the device at which the user is viewing the images recorded by the lens of the camera.

In another embodiment, a computer program product is provided for receiving an encryption key from an internet enabled camera using near field communication (NFC). The computer program product includes a computer readable storage medium having computer readable program code embodied therewith. The program instructions executable by a processor to cause the processor to send a request for an encryption key by internet based communication to a camera locally storing the encryption key in a security chip. The program instructions further include to receive, using the processor, a message from the camera that the encryption key has been transferred from the security chip of the camera to a near filed communication (NFC) module of the camera for transmission. The program instructions further cause the processor to generate, using the processor, a message to the user to position a device having the computer program product being executed thereon in close proximity to the camera after receiving the message that the encryption key is present at a near filed communication (NFC) module of the camera. Additionally, the program instructions further cause the processor to receive a near field communication (NFC) signal from the near filed communication (NFC) module of the camera, wherein the near filed communication (NFC) signal includes the encryption key.

BRIEF DESCRIPTION OF THE DRAWINGS

The following description will provide details of embodiments with reference to the following figures wherein.

DETAILED DESCRIPTION

Figure 1:
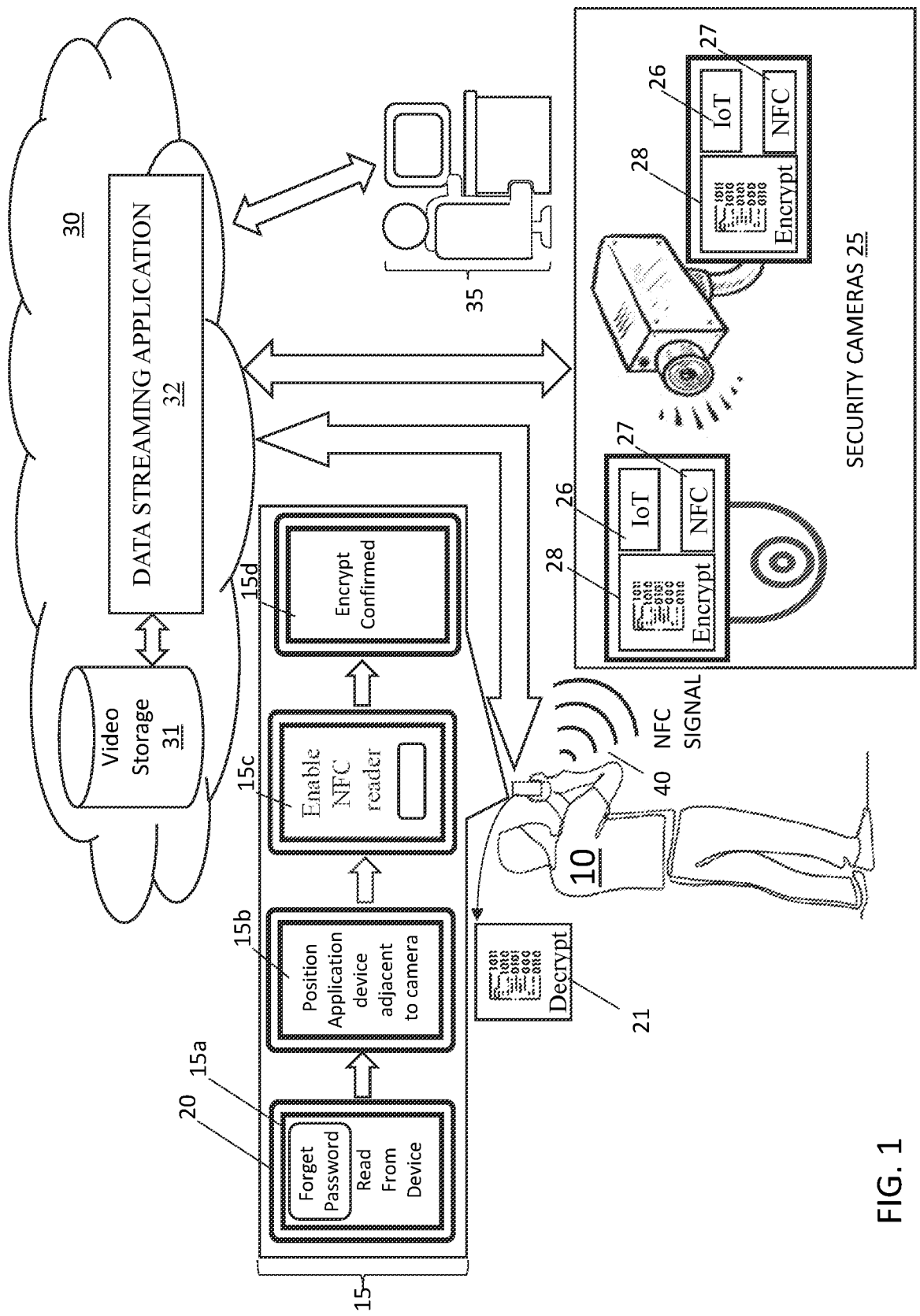
FIG. 1 illustrates one embodiment of an exemplary environment for the systems, methods and computer program products that employ near field communication (NFC) to provide secure and convenient encryption control for the user in camera applications.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Internet of things (IoT) camera devices are becoming more and more prevalent in residential applications. User can stream video remotely to monitor homes. Captured video clips can be stored in local memory, e.g., memory card, of the camera, or uploaded to the cloud. Further, users can remote-access real time video through the cloud. Cloud computing is the delivery of computing services—including servers, storage, databases, networking, software, analytics, and intelligence—over the Internet ("the cloud"). In the present case, the cloud storage is a remote storage device. The IoT-Camera-Cloud is the back-end system of IoT camera device. The Internet of Things (JOT) describes the network of physical objects, so known as, "things"—that are embedded with sensors, software, and other technologies that is used for the purpose of connecting and exchanging data with other devices and systems over the Internet. In the present scenario, the security cameras include Internet connectivity, in addition to all their other intended functionalities. An application, such as one running on a mobile internet connected device of the user, can download the video streaming from cloud and show it to the user.

However, it has been determined that the convenience of monitoring video feeds using internet of things (JOT) based cameras can also pose a threat to privacy. For example, there have been cases, in which platform security has been compromised. Encrypting video streaming for security purposes, typically is done using two approaches.

For example, in one approach, the encryption key is stored in the cloud. In this example, the IoT-Camera-Cloud, is the back-end system, and assigns an encryption key automatically (by an algorithm) to both Camera device and the application. The camera device will use this encryption key to encrypt the video streaming, then upload the encrypted video streaming to Cloud-storage. The application will use this encryption key to decrypt the video streaming which is download from Cloud-storage. The advantages of this solution are that it is convenient to share data, and it is easy to recover an encryption key.

However, it has been determined that this solution is not secure enough. In these scenarios, the encryption key is assigned, and stored at IoT-Camera-Cloud, the IoT-Camera-Cloud provider has the ability to view all video streaming, for example to perform a visual analysis without a notice. This is not end-user expected. Additionally, if someone gains access to the platform that is not authorized by the managing entity, e.g., a hackers, the unauthorized entity can the view all the videos for all the users of the service. This is a significant disadvantage.

In a second encryption approach, the encryption key is stored only locally, e.g., with the end users. In this example, the IoT-Camera-Cloud, the back-end system, will assign the default encryption key automatically (by an algorithm) to both IOT-camera device and APP. The user can change this encryption key through the application, and the key will be sent to the camera device. The IOT-camera and the cloud operator will not sore the key. The encryption key is only stored locally, with one copy with the APP (smart phone), the other with the camera device. In this example, there is no copy in the cloud. Camera devices will use this new encryption key to encrypt the video streaming, then upload the encrypted video streaming to cloud-storage. The application will use this new encryption key to decrypt the video streaming which is downloaded from cloud-storage.

The disadvantages to this second approach is that it is not particularly convenient. The user-changed encryption key is not stored at IoT-Camera-Cloud provider. If user loses this key, they cannot recover it from IoT-Camera-Cloud provider. This means that if user loses the encryption key, they can not open the videos which were previously encrypted. The advantage of this solution is that the system is very secure, as no one can access the video without having access to the smart phone or devices.

In view of the above disadvantages, the methods, systems, and computer program products provide a solution for security of internet based cameras, i.e., internet of things (JOT) security cameras, that provides secure encryption that is convenient for the user in cases in which the encryption key needs to be changed. In accordance with the methods, systems and computer program products of the present disclosure, a user changed encryption key is not stored at IoT-Camera-Cloud provider. By "IoT camera cloud provider", we are referring to the provider of the cloud services through which the cameras send the recorded video for being viewed by the user of the IoT cameras, who may view the video in the application as per transmission through the internet. Because the encryption key is not being stored by IoT-Camera-Cloud provider, and therefore cannot be accessed by the IoT-Camera-Cloud provider, the encryption method is very secure. By limiting access of the IoT-Camera-Cloud provider, if user loses the encryption key, he/she cannot recover from IoT-Camera-Cloud provider. However, the methods, systems and computer program products described herein employ near field communication technology module (NFC for example) along with a corresponding software to provide a mean by which the customer can access encryption keys. "Near Field Communication" (NFC) is a short-range wireless technology that enables simple and secure communication between electronic devices. It may be used on its own or in combination with other wireless technologies, such as Bluetooth. The communication range of NFC is roughly 10 centimeters. However, an antenna may be used to extend the range up to 20 centimeters. In some embodiments, an NFC module will be embedded in the camera device. The encryption key will not be permanently stored at this NFC module, otherwise any visitor would be able to pull the key out of the NFC. In some embodiments, the encryption key should be stored at IoT module (a security chip), while the NFC module serves as a bridge between the IoT module and the device on which the user is employing the application to use the security cameras. The methods, systems and computer program products of the present disclosure are now described in greater detail with reference to FIGS. 1-5.

Figure 2:
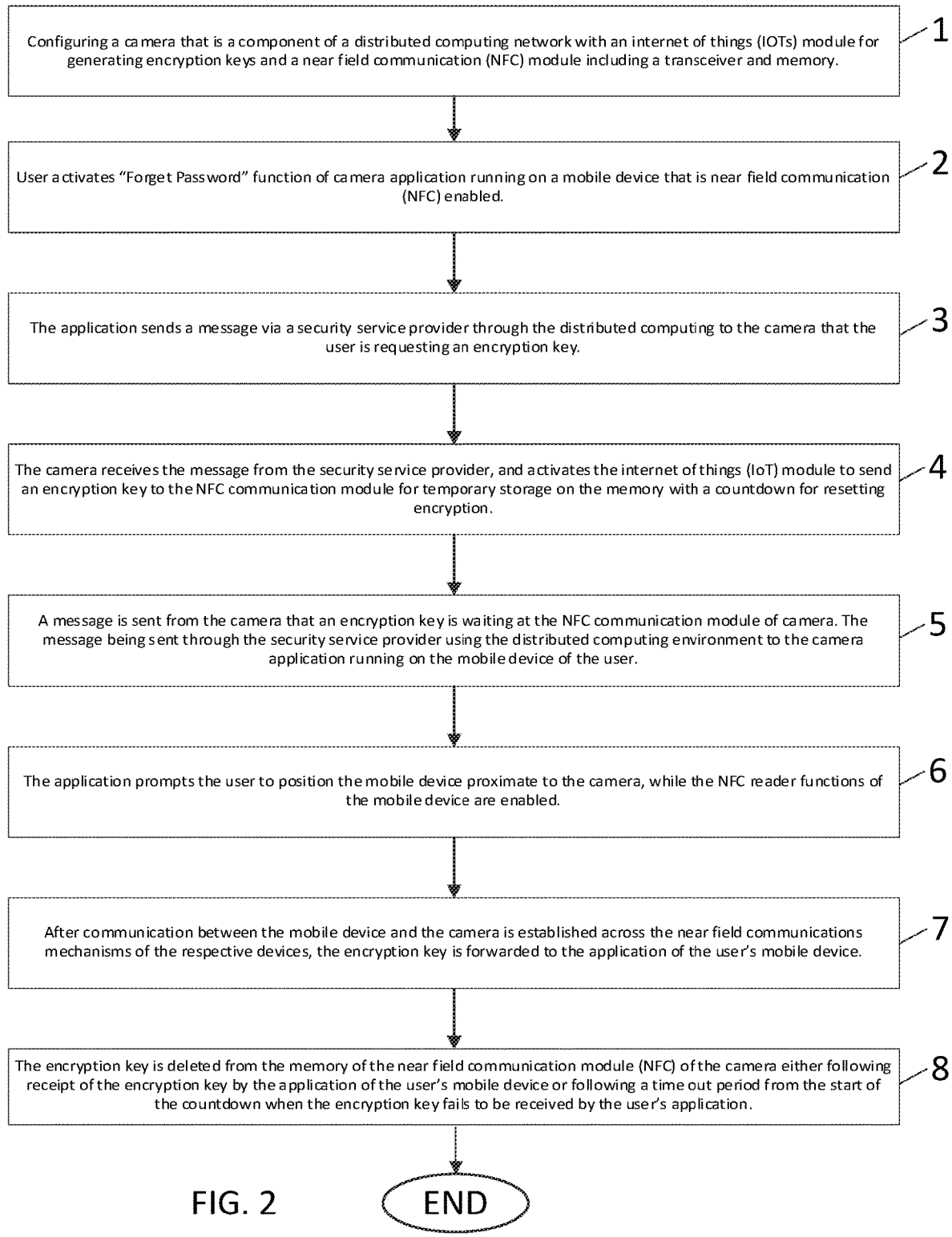
FIG. 2 is a flow chart/block diagram illustrating a method that that employs near field communication to provide secure and convenient encryption control for the user for camera applications, in accordance with one embodiment of the present disclosure.
Figure 3:
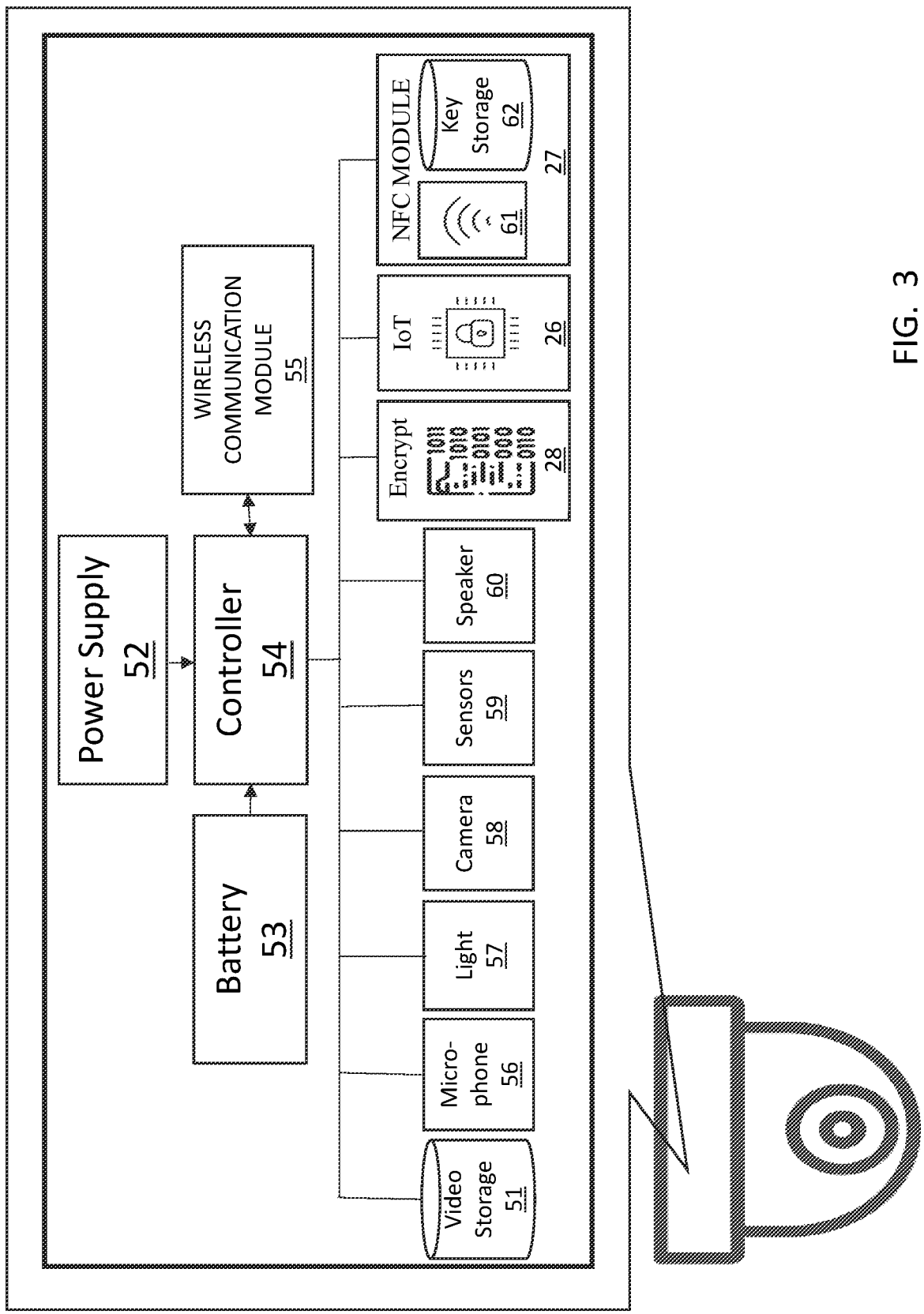
FIG. 3 is a block diagram of a camera including an internet of things (IoT) module for generating encryption keys and a near field communication (NFC) module including a transceiver and memory to act as a bridge for providing the encryption key to the user, in accordance with one embodiment of the present disclosure.

FIG. 1 illustrates one embodiment of an exemplary environment for the systems, methods and computer program products that employ near field communication to provided high security and convenient encryption control in cameras. FIG. 2 is a flow chart/block diagram illustrating a method that that employs near field communication to provide high security and convenient encryption control in security cameras. FIG. 3 illustrates a camera including an internet of things (IoT) module for generating encryption keys and a near field communication (NFC) module including a transceiver and memory to act as a bridge for providing the encryption key to the user.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, the camera systems described herein may include internet of things (IoT) cameras 25 that may be accessible through the internet 30. In this example, user 10 may access the video stream of the IoT cameras 25 using an application 15 run on a mobile computing device 20 that is under the control of the user 10. Similar to closed-circuit television systems (CCTV), the IoT cameras 25 can give provide eyesight on the security situation in order to reduce security incidents. While, CCTV cameras can only show and record video footage, IOT cameras 25 are connected with the internet 30, and therefore easily integrated with other smart devices, and systems that perform other tasks and turns security surveillance into smart safety and security management. The IoT cameras 25 can have some functions that are managed through a IoT-Camera-service provider 35. The IoT camera service provider 35 may be in communication with both the users, e.g., via the application 15 run on the mobile computing device 20, and may be in communication with the IoT cameras 25. The internet connectivity may be through a cloud computing environment. For example, although the IoT cameras 25 may have the ability to store recorded video stream locally, the IoT-camera-service provider 35 may also store video, e.g., in cloud based storage 31. This can be managed by the IoT-camera service provider 35. Additionally, the IoT-camera service provider 35 may maintain any software, e.g., updates, for the application 15 being run on the mobile computing device 20 of the uses. These are just some examples of how the IoT-camera service provider can interact with the IoT cameras and the users, e.g., through the application 15 run on the mobile computing device 20.

Additionally, as noted above, the IoT cameras 25 may be integrated with other functions and devices in a smart home enabled environment. Therefore, in addition to the IoT-Camera service provider 35, other third parties running smart home applications employing video feeds from the IoT cameras 25 may be granted access.

However, for all their advantages, the IoT camera 25 is also an internet connected computer, and is therefore susceptible to cyber type attacks. As noted above, a number of entities may have access to the cameras. A cyber type attack could gain access to the cameras, and from there, video clips or even live streams from those cameras would be accessible to parties that are not intended to have that type of access. Additionally, attackers can digitally break into a company that provides security video services, e.g., the IoT-Camera service provider 35. From there they gain admin access to the companies' servers.

The methods, systems and computer program products of the present disclosure provide encryption that is both secure, and convenient for the user to access, in the event that the user loses their encryption key. In the present case, the encryption key is stored locally in an IoT module 26 of the security cameras. The IoT module 26 includes a form of memory, e.g., a memory device. The memory of the IoT module 26 may be a random access memory (RAM), a read-only memory (ROM), an erasable programmable read-only memory (EPROM or Flash memory), a static random access memory (SRAM), a memory stick, and any suitable combination of the foregoing. In some embodiments, the IoT module 26 may be referred to as a security chip. The memory of the IoT module 26 has read and write capability. In this manner, during initial startup and commissioning of the cameras, the IoT-Camera-service provider 35 may have a copy of the encryption key that is stored on the IoT module 26. However, this is only during the startup process, and this encryption key is referred to as the admin start up key. The admin start up key is on the IoT module 26 of the IoT cameras at the time of manufacture. During initial startup and commissioning, using the startup procedures for the application 15 being run on the mobile computing device 20, the admin start up key allows for the user 10 to access the camera 25 and then set their own encryption key. The user set encryption key is stored on the IoT module 26, e.g., security chip. At this point, once the user 10 has replaced the admin start up key with their own selected encryption key, the IoT-camera-service provider no longer has any knowledge of the encryption key, which is stored locally at the IoT module 26, e.g., security chip.

The encryption that employs the encryption key is used to encrypt video locally, as taken at the IoT cameras 25. Following encryption, the encrypted data is sent via the internet 30 to the user 10. The IoT camera service provider 35 can provide a data streaming application 32, which can be cloud based. The encryption is not performed in the cloud, but it locally performed at that IoT cameras with an encryption engine 28. The encrypted data is transmitted from the IoT cameras via the data streaming application 32, which may be cloud based, that is managed by the IoT camera service provider. The encrypted data is received at the mobile computing device 20 of the user 10. More specifically, the encrypted data is received by the application 15 of the mobile computing device, which includes a decryption engine 21. The decryption engine 21 upon receiving the encrypted data, can decrypt the data received from the data streaming application 32, hence converting the encrypted data into a video stream of the area being recorded by the IoT cameras 25. Similar to the encryption being performed locally at the camera, decryption is performed locally at the mobile computing device 20. Only when both the IoT cameras 25 and the application 15 on the mobile computing device 20 have matching encryption keys can the video that is recorded and encrypted by the IoT cameras 25 be viewed as a video stream in the application 15 following decryption.

The mobile computing device 20 (or handheld computer) of the user 10 is a computer small enough to hold and operate in the hand. For example, any handheld computer device can have an LCD or OLED flatscreen interface, providing a touchscreen interface with digital buttons and keyboard or physical buttons along with a physical keyboard. Many such devices can connect to the Internet and interconnect with other devices such as car entertainment systems or headsets via Wi-Fi, Bluetooth, cellular networks or near field communication (NFC).

The mobile computing device 20 can be a phone, e.g., smart phone, tablet computer or even a laptop computer. Integrated cameras, the ability to place and receive voice and video telephone calls, video games, and Global Positioning System (GPS) may all be integrated into the mobile computing device. Power can be provided by a lithium-ion battery. Mobile devices may run mobile operating systems that allow third-party apps specialized for said capabilities to be installed and run.

The mobile computing device 20 includes the application 15, which may be software based, that communicates with the IoT cameras 25 through the data streaming application 30 that is managed by the IoT-camera service provider 35. The system of the application 15 that is run locally at the mobile computing device 20 of the user 10; the cloud based data streaming application 30 managed by the IoT camera service provider; and the IoT cameras 25 that may be positioned at the point of desired surveillance provide the user 10 with the ability to view video remotely from the IoT cameras over the internet 25. As noted, the data for the video is encrypted at the IoT cameras 25, transmitted by the data streaming application 32 in an encrypted state, and when received by the application 15 of the mobile computing device 20, the data of the video is decrypted to depict to the user on their mobile computing device 20 live streaming video taken by the IoT cameras of the area of surveillance.

Although, the IoT-camera service provider 35 does not have access to the encryption key following set up of the cameras 25, procedures are provided that allow for the user 10 to recover the encryption key. More specifically, in some embodiments, the IoT camera 25 also includes near field communication (NFC) capabilities. The camera 25 can include an NFC module 27 including a transceiver for sending and receiving NFC signals to the mobile device 20 of the user 10. The NFC module 27 functions as a bridge between the mobile device 20 of the user 10, and the IoT module 26 of the IoT camera 25. When the user 10 calls for the encryption key, the IoT module 26 sends the encryption key to the NFC module 27. The NFC module 27 includes memory for temporarily storing the encryption key received from the IoT module 26. The encryption key is sent to the mobile device 20 of the user 10 by near field communication signal, as sent from the NFC transceiver of the NFC module 27 in the IoT camera 25, and received by the NFC transceiver of the mobile device 20.

The application 15 includes a registration step. The registration step includes the user registering their devices, e.g., the IoT cameras 25, with their identities for recordation by the IoT-camera service provider 35. This can be a step of the process for commissioning the cameras 25 to runt with the data streaming application 32. The registration step is an additional level of security for the system. By registering, the IoT camera 25 and the users 10, when the user 10 requests a new encryption key, the IoT camera service provider 35 can determine if the user should have access to the cameras by checking the IoT camera serial number to a databased of registered users. If from the registry, the IoT camera service provider 35 determines that the user 10 should have access to the camera, the method for retrieving the encryption key depicted in FIG. 2 may be initiated including blocks 2 and 3.

Referring to FIG. 2, in one embodiment, at block 1, the method includes configuring the IoT camera 25 with an IoT module 26, e.g., security chip, and a near field communication (NFC) module 27 including a transceiver and memory. In the instances, at which a user 10 wants to receive the encryption key, e.g., they lost their encryption key, the user access the application for 15 for using the IoT cameras on their mobile computing device 20, and the user activates a "forget password" function, which is in block 2 of the process flow depicted in FIG. 2. Referring to FIG. 1, activating the "forget password" function of the application can include activating a field identified as "forget password" on the user interface, e.g., touch screen, of the user's mobile computing device 20, which is illustrated by screen shot having reference number 15*a*. There may also be a physical button or keystroke to start the "forget password" functionally. Any hardware input device may be used, such as touchpads.

Referring to block 3, following the activation of the "forget password function", the application then sends a message through internet connection 30 to the IoT cameras 25. The message may be sent through the data streaming application 32 that is being managed by the IoT-camera service provider 35. The message is that the user is requesting an encryption key.

Turning to block 4, in a following step, the IoT camera 25 receives the message of the encryption request. The IoT camera 25 may receive the message via connectivity to the internet. The message that the user is requesting the security key can be sent to the IoT camera 25 through the data streaming application 32. Upon receipt of the message for the encryption key request, the IoT camera 25 sends the encryption key that is locally stored on the IoT module 26, e.g., security chip, to the NFC module 28. The transmission of the encryption key from the IotT module 26 to the NFC module 28 is a local operations that occurs without this information being forwarded to the internet 30 and/or without this information being known by the IoT-camera service provider 35. The encryption key is being temporarily stored on the memory of the NFC module 28. Additionally, starting with the encryption key being temporarily stored on the memory of the NFC module, a countdown is started. As noted, the encryption key is stored temporarily on the memory of the NFC module. Upon successful transfer by NFC communication of the encryption key to the application 15 running on the user's mobile computing device, the encryption key is deleted from the NFC module 28, i.e., is erased from the memory in the NFC module 28. Additionally, if the transfer of the encryption key from the memory of the NFC module 28 fails, or the transfer does not occur within a pre-specified time window as measured by the countdown, the encryption key is deleted from the NFC module 28. The encryption key is only stored for long term durations in the IoT module 27, which is not accessible. In this manner, the encryption key is securely stored locally at the IoT camera 25. The encryption key is only accessible though the NFC module 28. When the encryption key is not being temporarily stored on the memory of the NFC module 28, the encryption key is not available.

Turning to block 5 of the method depicted in FIG. 2, once the encryption key is stored at the memory of the NFC module 28 of the IoT camera 25, the method can continue with a message being sent from the camera to the user that the encryption key is waiting at the NFC communication module 28 of the IoT camera 25. The message is sent through the internet 30. In some examples, the message is sent through the data streaming application 31 being managed by the IoT-camera service provider 35.

Referring to block 6 of FIG. 2, upon receipt of the message that an encryption key is stored at the memory of the NFC module 28 of the IoT camera 25 by the application 15 of the mobile computing device 20, the application 15 prompts the user to position the mobile device proximate to the camera 25. Referring to FIG. 1, the prompt "position application device adjacent to camera" can be displayed on the user interface, e.g., touch screen, of the user's mobile computing device 20, which is illustrated by screen shot having reference number 15b. Similar to the IOT camera 25, the mobile device 20 has a near field communication (NFC) transceiver. In some embodiments, and addition instruction may be displayed on the display of the mobile computing device 20 instructing the user 10 to enable the NFC transceiver of the mobile device 20. This is an optional step. Referring to FIG. 1, the prompt "Enable NFC reader" can be displayed on the user interface, e.g., touch screen, of the user's mobile computing device 20, which is illustrated by screen shot having reference number 15c.

Referring to block 7 of FIG. 2, when the user 10 positions the mobile computing device 20 close to the IoT camera device 25, due to the established communication between the NFC transceiver of the NFC module 27 of the IoT camera 25 and the NFC transceiver of the mobile computing device 20, an NFC signal will transfer the encryption key from the memory of the NFC module 27 to the application 15 of the mobile computing device 20. The transfer of the encryption key from the NFC module 27 of the IoT camera 25 to the NFC transceiver of the mobile computing device 20 of the user 10 is entirely by NFC signal 40, as depicted in FIG. 1. In some embodiments, the distance that the mobile computing device 20 and the IoT camera 25 that is suitable for communication between the devices by NFC signal 40 may be about 5 cm or less. In one example, the distance that the mobile computing device 20 and the IoT camera 25 that is suitable for communication between the devices by NFC signal may range from about 1 cm to about 5 cm.

There is no internet transmission of the encryption key in the process depicted in FIGS. 1 and 2. The encryption key is transmitted directly from the NFC module 27 of the IoT camera 25 to the mobile computing device 20 solely using the NFC signal 40. The application 15 of the mobile computing device 20 can employ the encryption key along with the decryption engine 21 to convert the encrypted data from the data streaming application 32 into a video stream. In some examples, only when both the IoT camera 25 and the application 15 on the mobile computing device 20 have the same encryption key can the encrypted data be decrypted into the video stream illustrating the content being monitored by the IoT camera 25, e.g., monitored in real time.

Referring back to FIG. 2, the method may further include erasing the encryption key from the memory of the NFC module 27 of the IoT camera 25. As noted, the NFC module 27 only stores the encryption key temporarily. For example, the encryption key can be stored in the memory of the NFC module until a copy is sent to the application 15 on the mobile computing device 20 using the NFC signal 40. Once the encryption key information is sent to the application 15 on the mobile computing device 20, the encryption key is erased from the memory of the NFC module 27. Additionally, in the event that the encryption key is forwarded from the IOT module 26, e.g., security chip, to the NFC module 27, and there is no transfer via NFC signal within the time out period, the encryption key is automatically erased from the NFC module 27. As noted, there is a countdown time for when the transfer of the encryption key is to be completed. By deleting the encryption key from the NFC module 27, the methods, systems and computer program products enhance the security of the system by removing the encryption key from any transmission media when transfer is not imminent.

FIG. 3 is a block diagram of a camera 25 including an internet of things (IoT) module 26 for generating encryption keys and a near field communication (NFC) module 27 including a transceiver 61 and memory 62 to act as a bridge for providing the encryption key to the user, in accordance with one embodiment of the present disclosure. The camera 25 depicted in FIG. 3 is one example of a camera that may be used for the methods and systems described with reference to FIGS. 1 and 2. In some embodiments, the memory 62 may be provided using a FLASH memory device.

The camera 25 generally includes a body for housing a camera lens 58. Any type of suitable camera lens 58 desired may be used in conjunction with the security device. For example, a camera that utilizes a fish-eye lens capable of capturing a 180 degree peripheral view may be used. Wide-angle lenses or other lenses may be used. In some configurations, multiple cameras 30 may be used in conjunction to obtain a 360 degree view. The camera 25 may include standard features known in the industry, such as night vision, high definition, cloud storage for data, etc. The particular camera features implemented in the lens and/or circuitry may be varied to meet the design criteria of any particular implementation.

The housing of the camera 25 may be formed of any appropriate material, such as rubber, plastic, metal etc. The camera housing may include a rotatable and/or extendable mount to allow complete position adjustability of the camera 25. The body of the camera 25 may also optionally include one or more lights 57 (such as LEDs, IR illuminators, etc.), a speaker 60, a motion detector (sensors 59), a microphone 56, an ambient light sensor (sensors 59), etc. Additionally, the body may house circuitry such as a power converter and a wireless networking module (wireless communication module 55).

Embodiments have been contemplated in which the power supply 52 is hard wired to the camera 25. Embodiments have been contemplated in which the camera is powered by batteries 53, such as lithium ion batteries. Internally, the device may include any desirable rectifier/power converter circuitry for reducing/converting the AC power current (for example, standard USB, 5 volts DC, 1 amp, or 2 amp) for operation of camera components, LEDs, etc., connected to the security device. Embodiments have also been contemplated, in which batteries 53 provide a backup power source, when the primary power fails, e.g., the power supply 52 fails.

Additionally, the housing of the camera 25 may house a controller 54. The controller 54 may include, for example, storage and a processor (hardware processor), etc. As employed herein, the term "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Referring to FIG. 3, the controller 54 may be used to communicate commands from a wireless communication module 55 to the components of the camera. In some examples, the wireless communication module 55 is in communication with the internet 30. The wireless module may include, for example, a wireless transmitter and a wireless receiver. Any suitable wireless protocol may be used, such as a WiFi antenna, Z-wave, Zigbee, IR, Bluetooth, or any other suitable wireless or cellular technology. The wireless communication module 55 may be configured to connect and send data to a local network and/or a mobile handheld device through a wireless connection. Such data may be communicated, for example, to a wireless router, a central alarm system, and/or a remote web interface or application (see FIG. 5, below). The wireless transmitter 55 may provide for transmitting images and data from the camera to a computer network, such as local hard drive, or a remote cloud computing drive, or both. The wireless receiver 55 may allow for receiving signals via the network for operation and control of the camera, e.g., positioning commands for one or more gimbal motors, and/or focusing commands for the camera lens 58, commands for lights 57, and other sensors 59 provided on the camera 25.

The controller 54 may be operatively electrically connected to coordinate operation of the other components of the camera 25. For example, the controller 86 may communicate video data from the camera lens 58 to the encryption engine 28, and then once the video data is encrypted, the controller 86 can then send the encrypted data to the wireless communication module 55 to then be transmitted by a wireless transmitter communicating with the data streaming application 32 being managed by the IoT camera service provider 35 in a cloud environment 30. The controller 54 may also have video data, e.g., encrypted video data, that is taken using the camera lens 58 stored locally within the camera in video storage 51. The video storage 51 may be a type of memory that can be of any suitable type, such as RAM and/or ROM, or other suitable memory, and size, and in some cases may be implemented with volatile memory, non-volatile memory, or a combination thereof.

The controller 54 is also operatively connected to coordinate operation of the IoT module 26 and the NFC module 27, as part of the process sequence that allows for a user 10 to retrieve the encryption key that is locally stored on the IoT module 26, e.g., locally stored on a security chip of the IOT module 26. Consistent with the methods described with reference to FIGS. 1 and 2, the controller 54 may receive a message at the wireless communication module 55 for a request for the encryption key from a user over an internet based communication, as described in blocks 2-4 of FIG. 2. Referring to FIG. 3, the controller 54 can then move a copy of the encryption key from the IoT module 26, e.g., the encryption key, to a key storage 62 (temporary memory) of the NFC module 27. Further details of these steps are described above with reference to block 4 of FIG. 2. Once the encryption key is being stored in key storage 62, the controller can employ the wireless communication module 55 to send a message to the application 15 on the mobile device 20 of the user, that the encryption key is ready for transfer using the transceiver 61 of the NFC module. Further details of these steps are described in the descriptions of blocks 5 and 6 of FIG. 2. The NFC transceiver 61 of the NFC module 27 sends a copy of the encryption key by NFC signal 40 to the NFC transceiver that is present in the mobile device of the user 10, as described in the above description of block 6 of the method depicted in FIG. 2.

In some embodiments, the camera 25 may receive a signal confirming receipt of the encryption key at the mobile computing device 20. The controller 54 can then command that the copy of the encryption key that is being store in the key storage 62 of the NFC module 27 be erased. Further the controller 54 can also track the count down for when the encryption key is erased from the key storage 62 in the cases when the transfer operation times out without performing a successful transfer of the encryption key to the mobile computing device. Further details of these steps are described in the descriptions of blocks 7 and 8 of FIG. 2.

The controller 54 may also communicate audio data between the microphone 56, the wireless communication module 55, and the speaker 60. The controller may further communicate positioning commands received at the wireless communication module 55 to any camera gimbal motors. The light 57 may also be operated through the controller, such as for example, by an event being sensed by the motion sensor (sensors 59), and triggering the light 57.

Similarly, the light, camera, speaker, etc. may be controlled manually by users with access to the images and/or sounds from the camera 30 via the wireless communication module 75.

The wireless communication module 55 and controller 54 may utilize standard components known to one of ordinary skill in the art in connection with wireless transmission of signals and control of circuitry. In general, the wireless transmitter/receiver can communicate with a wireless router or a wireless hotspot within an operating range. Once connected to a network, for example, via a home computer, signals can be transmitted for real-time viewing, or recorded and stored, as desired. In some configurations, multiple devices, such as multiple smart phones, can be connected to the system for viewing or control purposes.

A web interface may provide the user with access to a system dashboard and home control via an iOS or Android smartphone or other Internet-enabled device.

Figure 4:
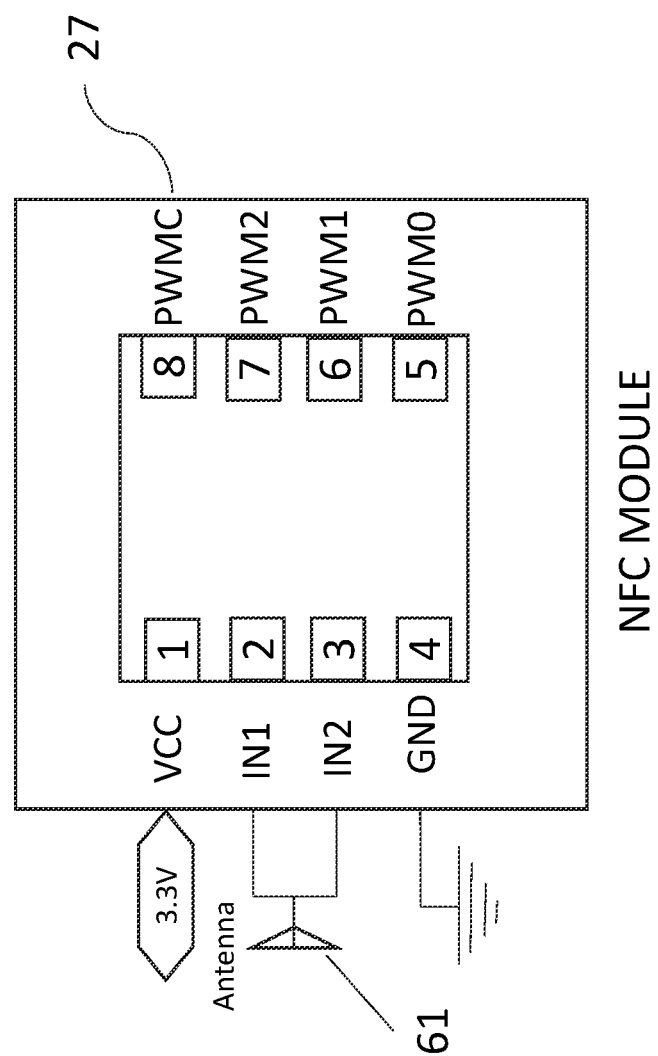
FIG. 4 is a circuit diagram of a near field communication (NFC) module of the driver electronics circuit depicted in FIG. 3, in accordance with one embodiment of the present disclosure.

FIG. 4 is a circuit diagram of an NFC circuit for the NFC module 27 depicted in FIGS. 1 and 3. The NFC module 27 may be provided by an ISO 15693 and NFC Forum Type 5 tag, with one or two pulse width modulation (PWM) outputs and 2 Kbits of electrically erasable programmable memory (EEPROM). The RF link is labeled in FIG. 4 as antenna. This can provide one embodiment of the NFC transceiver 61 of the NFC module 27. In some embodiments, the NFC module includes 256 bytes (64 blocks) of memory for the encryption key. The memory is accessible through the RF interface, following ISO/IEC 15693 or NFC Forum Type 5 Tag. The PWM outputs can be configured at boot time, and can be updated live through RF link. In some examples, NFC-writer-reader equipment write parameters to the NFC module, e.g., memory of the NFC module, by the antenna. The NFC module 27 may have a package configuration of one of SO8N and TSSOP8 or ECOPACK2 (RoHS compliant).

The present disclosure also includes embodiments for computer program products to be installed on the mobile computing device 20 to provide the application 15 for interfacing with the cameras 15 in order to transmit the encryption key using NFC signal 40, as depicted in FIG. 1.

Figure 5:
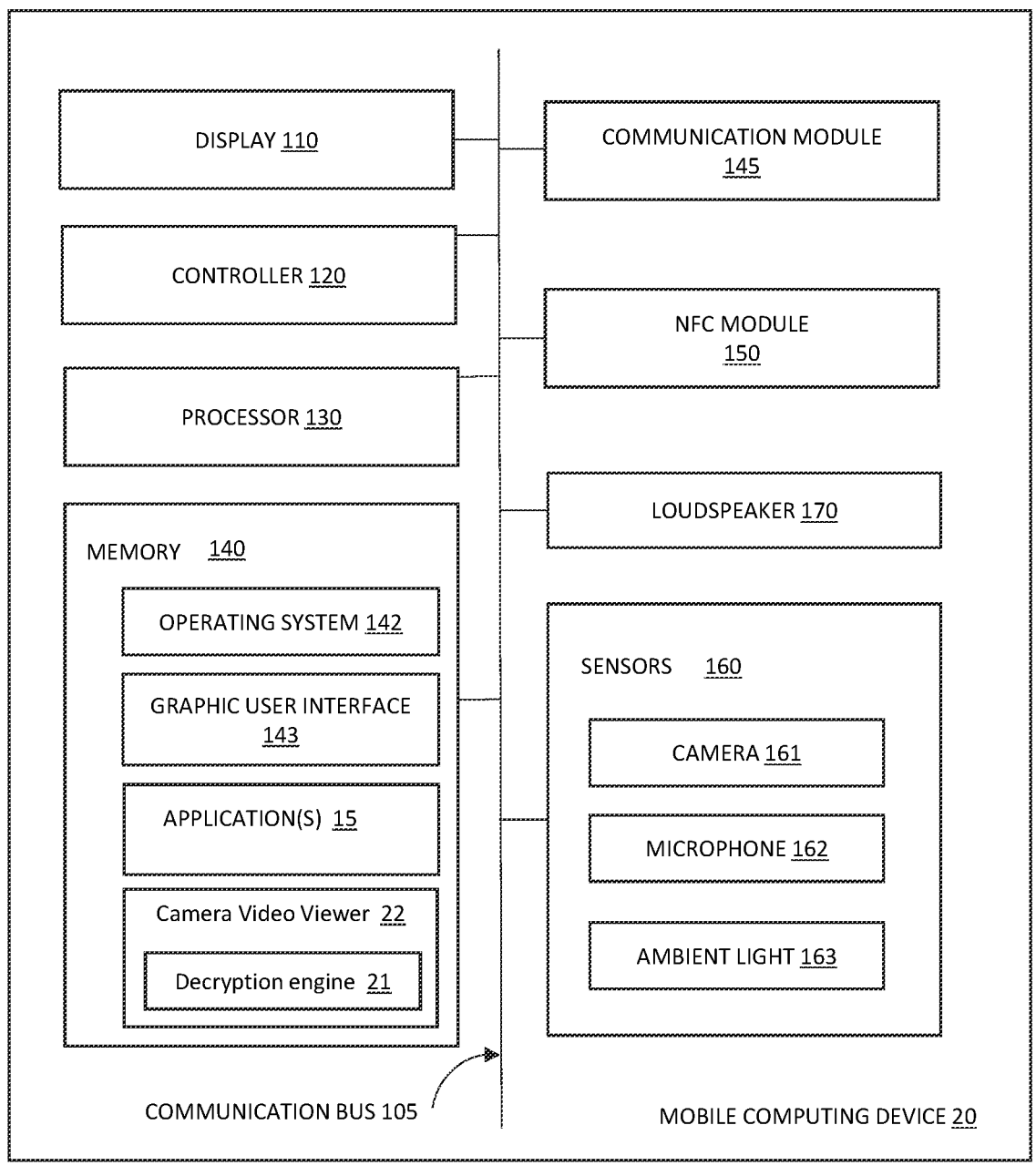
FIG. 5 is an illustration (block diagram) an exemplary mobile computing device including a near field communication transceiver for receiving an encryption key from a camera, in accordance with an embodiment of the present disclosure.

FIG. 5 depicts one embodiment of a mobile computing device 20 having a near field communication (NFC) transceiver 150 that is present therein for receiving the NFC signal 40 including an encryption key that sent by the NFC transceiver 61 of the NFC module 27 in the IoT camera 25. The mobile computing device 100 may also include a processor 130 coupled to memory 140. The processor 130 is configured to perform a set on instructions that are provided by an application 15 stored in the memory 140. The application 15 has been described above with reference to FIGS. 1-3, and provides that a user 10 is able to retrieve an encryption key that is locally stored on a camera 25 using near field communication (NFC). For example, the application 15 may be a computer program product that employs the processor 130 of the mobile computing device to request for an encryption key by internet based communication to the camera 25 that is locally storing an encryption key. The internet based communication may be provided by the communication module 145 of the mobile computing device 20.

The program instructions further include to receive, using the processor 130, a message from the camera 25 that the encryption key has been transferred from the security chip, e.g., IoT module 26, of the camera 25 to an NFC module 27 of the camera 25 for transmission. The program instructions further cause the processor 130 to generate a message on the display 110 to the user to position the mobile computing device 20 in close proximity to the camera 25 after receiving the message that the encryption key is present at an NFC module 27 of the camera. Additionally, the program instructions further cause the processor 130 to receive a near field communication (NFC) signal 40 from the NFC module 27 of the camera 25 including the encryption key. The NFC signal 40 is received by the mobile computing device 20 using a near field communication (NFC) transceiver 150. Once the encryption key is obtained by the mobile computing device 20, the user may view video streams on the display 110. Using the encryption key, data streams of encrypted video received through the communication module 145 that is in communication with the data streaming application 32 from the cameras 25 can be decrypted by the decryption engine 21 of the camera video viewer 22, and thereafter viewed on the display 110 by the user 10.

The mobile computing device 100 can be any of a wide range of computing platforms. In some embodiments, the mobile computing device 100 can be a laptop/notebook computer or sub-notebook computer; a tablet or phablet computer; a mobile phone or smartphone; a personal digital assistant (PDA); a portable media player (PMP); a cellular handset; a handheld gaming device; a gaming platform; a wearable or otherwise body-borne computing device, such as a smartwatch, smart glasses, or smart headgear; and/or a combination of any one or more thereof.

The display of the mobile computing device 100 be any electronic visual display or other device configured to display or otherwise generate an image (e.g., image, video, text, and/or other displayable content) therefrom. In some embodiments, the display 110 is a touchscreen display or other touch-sensitive display that can utilize any of a wide range of touch-sensing techniques, such as, for example: resistive touch-sensing; capacitive touch-sensing; surface acoustic wave (SAW) touch-sensing; infrared (IR) touch-sensing; optical imaging touch-sensing; and/or a combination of any one or more thereof.

The computing device 20 may include one or more controllers 120. A given controller 120 may be configured to output one or more control signals to control any one or more of the various components/modules of computing device 20 and may do so, for example, based on wired and/or wireless input received from a given local source (e.g., such as on-board memory 140) and/or remote source, e.g., the data streaming application 32 being run by the IoT camera service provider 35. The controller 120 can provide for interaction between the NFC transceiver 150, the application, and the communication module 145 in providing the process steps for receiving the encryption key that have been described above with reference to FIGS. 1-3.

The memory 140 of computing device 20 can be of any suitable type (e.g., RAM and/or ROM, or other suitable memory) and size, and in some cases may be implemented with volatile memory, non-volatile memory, or a combination thereof. As noted above, a given processor 130 of computing device 20 may be configured to perform operations associated with computing device 20 and one or more of the modules thereof (e.g., within memory 140 or elsewhere). In some cases, memory 140 may be configured to be utilized, for example, for processor workspace (e.g., for one or more processors 130) and/or to store media, programs, applications, and/or content on computing device 100 on a temporary or permanent basis. The application 15 described with reference to FIGS. 1 and 2 may be stored in a module of memory 140. Additionally, the decryption engine 21 that employs the encryption key to decrypt data streams for viewing video may be stored in a module of memory, as well as the camera video viewer 22 that is employed for viewing the decrypted video streams from the camera feeds on the display 110.

The one or more modules stored in memory 140 can be accessed and executed, for example, by the one or more processors 130 of computing device 100. In accordance with some embodiments, a given module of memory 140 can be implemented in any suitable standard and/or custom/proprietary programming language, such as, for example C, C++, objective C, JavaScript, and/or any other suitable custom or proprietary instruction sets, as will be apparent in light of this disclosure. The modules of memory 140 can be encoded, for example, on a machine-readable medium that, when executed by one or more processors 130, carries out the functionality of computing device 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 140 (e.g., such as operating system (OS) 142, graphic user interface (GUI) 143, and/or one or more applications, each discussed below) can be implemented in hardware, software, and/or firmware, as desired for a given target application or end-use. The memory 140 may include an operating system (OS) 142. The OS 142 can be implemented with any suitable OS, mobile or otherwise, such as, for example, Android OS from Google, Inc.; iOS from Apple, Inc.; BlackBerry OS from BlackBerry Ltd.; Windows Phone OS from Microsoft Corp; Palm OS/Garnet OS from Palm, Inc.; an open source OS, such as Symbian OS; and/or a combination of any one or more thereof. As will be appreciated in light of this disclosure, OS 142 may be configured, for example, to aid with performing a request for an encryption key that is locally stored on a camera, and receiving the encryption key solely by NFC signal 40.

In accordance with some embodiments, the mobile computing device 20 may include a graphic user interface (GUI) module 143. In some cases, GUI 143 can be implemented in memory 140. GUI 143 may be configured, to present a graphical UI (GUI) at display 110 to aid with performing a request for an encryption key that is locally stored on a camera, and receiving the encryption key solely by NFC signal 40.

In some embodiments, the mobile computing device 20 may include a communication module 145. The communication module 145 can be configured to communicate with the data streaming application 32 that is depicted in FIG. 1. The communication module 145 may be configured for wireless (e.g., Wi-Fi, Bluetooth, etc.) communication and/or wired communication (e.g., Universal Serial Bus or USB, Ethernet, FireWire, etc.) using any suitable wired and/or wireless transmission technologies (e.g., radio frequency, or RF, transmission; infrared, or IR, light modulation; etc.), as desired. In some embodiments, the communication module 145 may be configured for communication by cellular signal used in cellular phones, and cellular type devices. In some embodiments, communication module 145 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 145, as desired for a given target application or end-use.

In accordance with some embodiments, mobile computing device 20 may include one or more sensors 160, which can include at least one camera 161 (or image capture device), microphone 163 (or sound capture device), ambient light sensor 165, and/or any other suitable sensor.

In accordance with some embodiments, mobile computing device 20 may include one or more loudspeakers 170 or other audio output devices. Loudspeaker(s) 170 can be, for example, a speaker or any other device capable of producing sound from an audio data signal.

As illustrated in FIG. 6, the aforementioned elements of the mobile computing device 100 may be interconnected with a communications bus 105.

The present invention may be a system, a method, and/or a computer program product at any possible technical detail level of integration. For example, in some embodiments, a computer program product is provided for receiving an encryption key from an internet enabled camera using near field communication (NFC). The computer program product may include a computer readable storage medium. The storage medium may be non-transitory. The computer readable storage medium may have computer readable program code embodied therewith, the program instructions executable by a processor to cause the processor to send a request for an encryption key by internet based communication to a camera locally storing the encryption key in a security chip. The program instructions further include to receive, using the processor, a message from the camera that the encryption key has been transferred from the security chip of the camera to an NFC module of the camera for transmission. The program instructions further cause the processor to generate, using the processor, a message to the user to position a device having the computer program product being executed thereon in close proximity to the camera after receiving the message that the encryption key is present at the NFC module of the camera. Additionally, the program instructions further cause the processor to receive, using the processor, a near field communication (NFC) from the NFC module of the camera the encryption key.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. Having described preferred embodiments of a SECURITY CAMERA WITH INTEGRATED FIELD NEAR COMMUNICATION CONTROLLED ENCRYPTION METHOD, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting an encryption key from a camera to the mobile device of a user of the camera comprising:
   integrating an encryption key into a security chip that is housed within a camera;
   integrating a near filed communication (NFC) module into the camera, wherein the near field communication (NFC) module includes a near field communication (NFC) transceiver and memory;
   receiving a request for an encryption key at the camera through an internet based communication from a user of the camera;
   transmitting a copy of the encryption key from the security chip to the memory in the near field communication (NFC) module in response to the receiving of the request for the encryption key;
   transmitting the encryption key by near field communication from the near field communication (NFC) transceiver of the near field communication (NFC) module to a mobile device of the user, when the mobile device of the user is brought into near field communication (NFC) range of the camera; and
   deleting the encryption key from the memory of the near field communication (NFC) module of the camera when the encryption key is received by the mobile device.

2. The method of claim 1 further comprising deleting the encryption key from the memory of the near field communication (NFC) module after a time out period.

3. The method of claim 1, wherein the near field communication (NFC) range is 5 cm or less.

4. The method of claim 1, wherein the encryption key is used at the mobile device to decrypt encrypted data of a video stream recorded by the camera locally at the mobile device of the user.

5. The method of claim 1, wherein the encrypted data of the video stream is transmitted to the user through a cloud based data streaming application that is managed by a service providers for the camera.

6. The method of claim 5, wherein the service providers do not have access to the encryption key, and the encryption key is not transmitted using internet based cloud services.

7. A camera comprising:
   a lens for recording video and an encryption engine for encrypting the video;
   a security chip for storing an encryption key locally in the camera;
   a near field communication (NFC) module that provides a bridge between the security chip of the camera and a device at which a user is viewing images recorded by the lens, wherein the near field communication (NFC) module includes memory for temporarily storing the encryption key transmitted to the near field communication (NFC) module from the security chip in response to a user request for the encryption key, and a near field communication (NFC) transceiver for sending the encryption key by near field communication (NFC) signal from the memory of the near field communication (NFC) module to the device at which the user is viewing the images recorded by the lens of the camera; and a module for deleting the encryption key from the memory of the near field communication (NFC) module in the camera when the encryption key is received by the device.

8. The camera of claim 7, wherein the camera includes a timer for measuring a time out period that starts after transmitting the encryption key from the security chip to the near field communication (NFC) module, the camera deleting the encryption key from the memory of the near field communication (NFC) module after the conclusion of the time out period.

9. The camera of claim 7, wherein a range of the near field communication (NFC) signal is 5 cm or less.

10. The camera of claim 7, further comprising an encryption engine.

11. The camera of claim 7, wherein the encryption engine is locally used at the camera to encrypt data of a video stream recorded by the camera.

12. The camera of claim 11 further including a wireless communication module for sending the data of the video stream encrypted by the encryption engine by internet based communication to the user.

13. The camera of claim 7, wherein the data of the video stream encrypted by the encryption engine of the camera is transmitted to the user through a cloud based data streaming application that is managed by a service providers for the camera.

14. The camera of claim 7, wherein the near field communication (NFC) signal is the only mechanism by which the encryption key is transmitted from the camera.

15. The camera of claim 7, wherein the service providers do not have access to the encryption key, and the encryption key is not transmitted using internet based cloud services.

16. A computer program product that receives an encryption key from an internet enabled camera using near field communication (NFC) comprising a computer readable storage medium having computer readable program code embodied therewith, the program instructions executable by a processor to cause the processor to:

send, using the processor, a request for an encryption key by internet based communication to a camera locally storing the encryption key in a security chip;

receive, using the processor, a message from the camera that the encryption key has been transferred from the security chip of the camera to a near field communication (NFC) module of the camera for transmission;

generate, using the processor, a message to the user to position a device having the computer program product being executed thereon in close proximity to the camera after receiving the message that the encryption key is present at a near field communication (NFC) module of the camera;

receive, using the processor, at the device a near field communication (NFC) signal from the near field communication (NFC) module of the camera, the near field communication (NFC) signal including the encryption key; and delete the encryption key being stored in the communication (NFC) module of the camera after the encryption key is received at the device.

17. The computer program product of claim 16, wherein to receive the near field communication signal, the device must be with a near field communication (NFC) range of the camera, the near field communication (NFC) range of the camera being 5 cm or less.

18. The computer program product of claim 16 further comprising receiving, using the processor, encrypted data of a video stream by internet based communication from the camera.

19. The computer program product of claim 18, wherein the device includes a decryption engine, wherein the decryption engine uses the encryption key to decrypt the encrypted data of the video stream locally at the device.

* * * * *